US012628945B2

(12) United States Patent
Mahabaleshwara et al.

(10) Patent No.: US 12,628,945 B2
(45) Date of Patent: May 19, 2026

(54) WORK AND DINE DIVAN

(71) Applicant: B/E Aerospace, Inc., Winston-Salem, NC (US)

(72) Inventors: Aravinda Mahabaleshwara, Hyderabad (IN); Ashwin Srinivasa, Hyderabad (IN)

(73) Assignee: B/E Aerospace, Inc., Winston-S alem, NC (US)

( * ) Notice: Subject to any disclaimer, the term of this patent is extended or adjusted under 35 U.S.C. 154(b) by 246 days.

(21) Appl. No.: 18/422,595

(22) Filed: Jan. 25, 2024

(65) Prior Publication Data

US 2025/0194792 A1 Jun. 19, 2025

(30) Foreign Application Priority Data

Dec. 13, 2023 (IN) .............................. 202311085112

(51) Int. Cl.
| | |
|---|---|
| *A47B 39/02* | (2006.01) |
| *A47B 39/08* | (2006.01) |
| *A47B 85/04* | (2006.01) |
| *B64D 11/06* | (2006.01) |

(52) U.S. Cl.
CPC .............. *A47B 39/02* (2013.01); *A47B 39/08* (2013.01); *A47B 85/04* (2013.01); *B64D 11/0605* (2014.12); *B64D 11/0639* (2014.12)

(58) Field of Classification Search
CPC ......... A47B 39/02; A47B 85/04; A47B 39/08; A47C 13/00; B64D 11/0605; B64D 11/0639
See application file for complete search history.

(56) References Cited

U.S. PATENT DOCUMENTS

| | | | |
|---|---|---|---|
| 1,557,300 A | 10/1925 | Lucus | |
| 2,642,925 A | 6/1953 | Seymour | |
| 2,675,859 A * | 4/1954 | Abler ..................... A47C 13/00 |
| | | | 297/121 |
| 3,310,815 A | 3/1967 | Griffin | |
| 4,736,998 A | 4/1988 | Wilson et al. | |
| 4,834,450 A | 5/1989 | Stickler | |
| 6,305,644 B1 | 10/2001 | Beroth | |
| 7,070,149 B2 | 7/2006 | Mcdonnell | |

(Continued)

FOREIGN PATENT DOCUMENTS

| | | | | |
|---|---|---|---|---|
| CN | 107048775 A * | 8/2017 | ............. | A47B 13/08 |
| KR | 20140008054 A | 1/2014 | | |

(Continued)

OTHER PUBLICATIONS

European Patent Office, Extended European Search Report received in EP Application No. 24213697.6, Apr. 23, 2025, 9 pages.

*Primary Examiner* — Milton Nelson, Jr.
(74) *Attorney, Agent, or Firm* — Suiter Swantz IP

(57) ABSTRACT

A divan is configurable between upright and table configurations. The divan includes linkages which enable rotation of a backrest from the upright configuration to the table configuration. The divan includes a seat pan which is joined in the upright configuration and split in the table configuration. Joining the seat pan in the upright configuration provides a seating region with extra length. Splitting the seat pan in the table configuration provides two seating regions, one on each side of the table.

15 Claims, 12 Drawing Sheets

100

(56)          References Cited

U.S. PATENT DOCUMENTS

| | | |
|---|---|---|
| 7,156,462 B2 | 1/2007 | Verny et al. |
| 7,427,106 B2 | 9/2008 | Williamson et al. |
| 11,059,589 B2 | 7/2021 | Oleson et al. |
| 11,358,504 B2 | 6/2022 | Natuzzi |
| 11,577,840 B2 | 2/2023 | Erhel et al. |
| 11,679,882 B2 | 6/2023 | Erhel et al. |
| 2014/0246886 A1 | 9/2014 | Savard et al. |
| 2020/0367647 A1 | 11/2020 | Green |

FOREIGN PATENT DOCUMENTS

| | | | |
|---|---|---|---|
| WO | 2007149863 A2 | 12/2007 |
| WO | 2017203400 A2 | 11/2017 |

* cited by examiner

100

100

100

100

100

100

100

100

WORK AND DINE DIVAN

CROSS-REFERENCE TO RELATED APPLICATIONS

The present application claims the benefit of India Provisional Patent Application 202311085112, filed Dec. 13, 2023, titled "WORK AND DINE DIVAN", with a DAS code of A85C, which is incorporated herein by reference in the entirety.

TECHNICAL FIELD

The present invention generally relates to details specifically related to aircraft seats, and more specifically to features for converting the seats.

BACKGROUND

Cabin layouts may be designed to optimize the relatively limited cabin space in an aircraft, especially in business aircrafts which have a narrower body than larger commercial aircrafts. Furniture such as seats, chairs, tables, and divans may be part of the cabin interior and located within the cabin in a manner to facilitate usability and operability of the cabin. The tables and divans may be separately installed to provide the desired functionality. Therefore, it would be advantageous to provide a device, system, and method that cures the shortcomings described above.

SUMMARY

A divan is described, in accordance with one or more embodiments of the present disclosure. The divan comprises a fixed assembly. The fixed assembly comprises a pair of fixed base frames. The fixed assembly comprises a fixed seat pan cushion. The fixed seat pan cushion extends between and couples the pair of fixed base frames. The divan comprises a trackable assembly. The trackable assembly comprises a pair of trackable base frames. The trackable assembly comprises a trackable seat pan cushion. The trackable seat pan cushion extends between and couples the pair of trackable base frames. The trackable assembly comprises a pair of trackable armrests. The pair of trackable armrests are coupled to the pair of trackable base frames. The divan comprises a backrest assembly. The backrest assembly comprises a seat back cushion. The backrest assembly comprises a table top. The seat back cushion and the table top are disposed on opposing faces of the backrest assembly. The divan comprises a pair of rotatable linkages. The fixed assembly, the trackable assembly, the backrest assembly, and the pair of rotatable linkages form a pair of four-bar linkages. The divan is configurable between an upright configuration and a table configuration.

In embodiments, the divan comprises a pair of floor tracks. The pair of floor tracks are aligned in parallel. The pair of fixed base frame and the pair of trackable base frames are coupled to the pair of floor tracks. The trackable assembly tracks along the pair of floor tracks causing the divan to be configured between the upright configuration and the table configuration. The fixed assembly is fixed to the pair of floor tracks as the trackable assembly tracks along the pair of floor tracks.

In embodiments, the fixed assembly comprises a fixed backrest frame. The fixed backrest frame extends between and couples the pair of fixed base frames. The backrest assembly covers the fixed backrest frame when the divan is in the upright configuration. The backrest assembly does not cover the fixed backrest frame when the divan is in the table configuration.

In embodiments, the pair of fixed base frames each comprise a pair of fixed vertical portions and a fixed horizontal portion. The fixed horizontal portion extends between the pair of fixed vertical portions.

In embodiments, the pair of fixed base frames each comprise a stopper portion. The stopper portion extends from the fixed horizontal portion. The pair of rotatable linkages abut the stopper portion of each of the pair of fixed base frames when the divan is in the table configuration.

In embodiments, the pair of trackable base frames abut the pair of fixed base frames when the divan is in the upright configuration.

In embodiments, the pair of trackable base frames each comprise a trackable vertical portion. The pair of trackable base frames each comprise a trackable horizontal portion. The trackable horizontal portion extends from the trackable vertical portion. The pair of trackable base frames each comprise a trackable linkage portion. The trackable linkage portion extends from the trackable horizontal portion. The trackable linkage portion of each of the pair of trackable base frames are disposed above the pair of fixed base frames when the divan is in the upright configuration.

In embodiments, the pair of trackable armrests enclose the trackable linkage portion of each of the pair of trackable base frames and the pair of rotatable linkages.

In embodiments, the fixed seat pan cushion and the trackable seat pan cushion provide a joint seat pan when the divan is in the upright configuration. The fixed seat pan cushion and the trackable seat pan cushion are separated by the backrest assembly when the divan is in the table configuration.

In embodiments, the fixed seat pan cushion and the trackable seat pan cushion abut and are flush to provide the joint seat pan when the divan is in the upright configuration.

In embodiments, the divan comprises a first pair of revolute joints. The pair of fixed base frames and the pair of rotatable linkages are coupled by the first pair of revolute joints. The divan comprises a second pair of revolute joints. The backrest assembly and the pair of rotatable linkages are coupled by the second pair of revolute joints. The divan comprises a third pair of revolute joints. The trackable assembly and the backrest assembly are coupled by the third pair of revolute joints. The fixed assembly, the trackable assembly, the backrest assembly, and the pair of rotatable linkages form the pair of four-bar linkages through rotation about the first pair of revolute joints, the second pair of revolute joints, and the third pair of revolute joints in combination with tracking of the trackable assembly.

In embodiments, the pair of fixed base frames are disposed between the pair of rotatable linkages.

In embodiments, the pair of rotatable linkages comprise a boomerang shape.

In embodiments, the backrest assembly is disposed at a seatback angle when the divan is in the upright configuration. The backrest assembly is disposed at a table angle when the divan is in the table configuration.

In embodiments, the fixed assembly, the trackable assembly, and the backrest assembly jointly provide a seating region when the divan is in the table configuration. The fixed assembly and the trackable assembly separately provide seating regions when the divan is in the table configuration.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
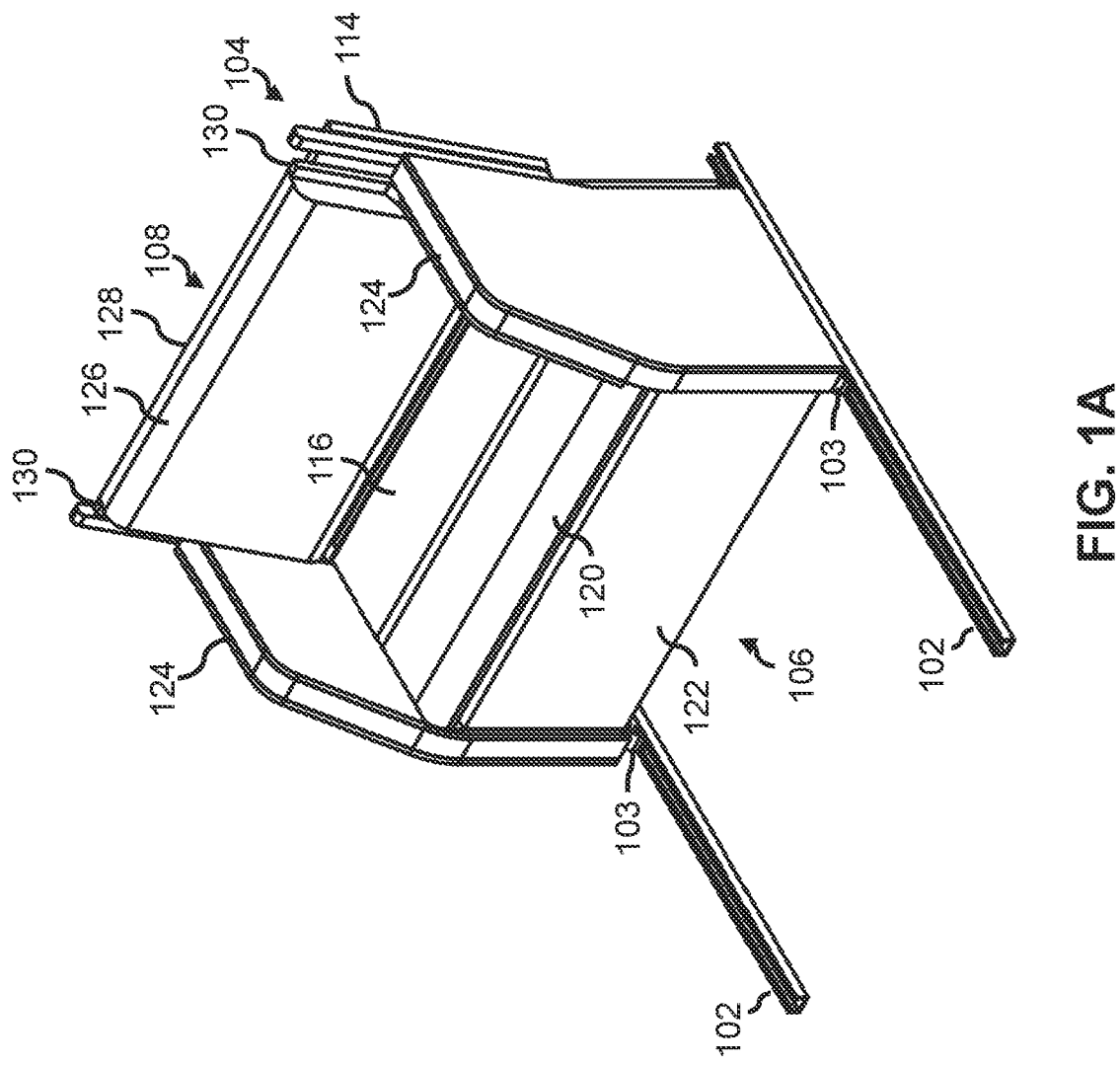
FIG. 1A depicts a front right perspective view of a divan in an upright configuration, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, wellknown features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are directed to a work and dine divan. The divan is configurable between upright and table configurations. The divan includes linkages which enable rotation of a backrest from the upright configuration to the table configuration. The divan includes a seat pan which is joined in the upright configuration and split in the table configuration. Joining the seat pan in the upright configuration provides a seating region with extra length. Splitting the seat pan in the table configuration provides two seating regions, one on each side of the table.

U.S. Publication Number US20140246886A1, titled "Aircraft divan convertible to a bunk bed"; U.S. Ser. No. 11/577,840B2, titled "Aircraft divan"; U.S. Ser. No. 11/059,589B2, titled "Three-place berthing aircraft divan"; are each incorporated herein by reference in the entirety.

Figure 1B:
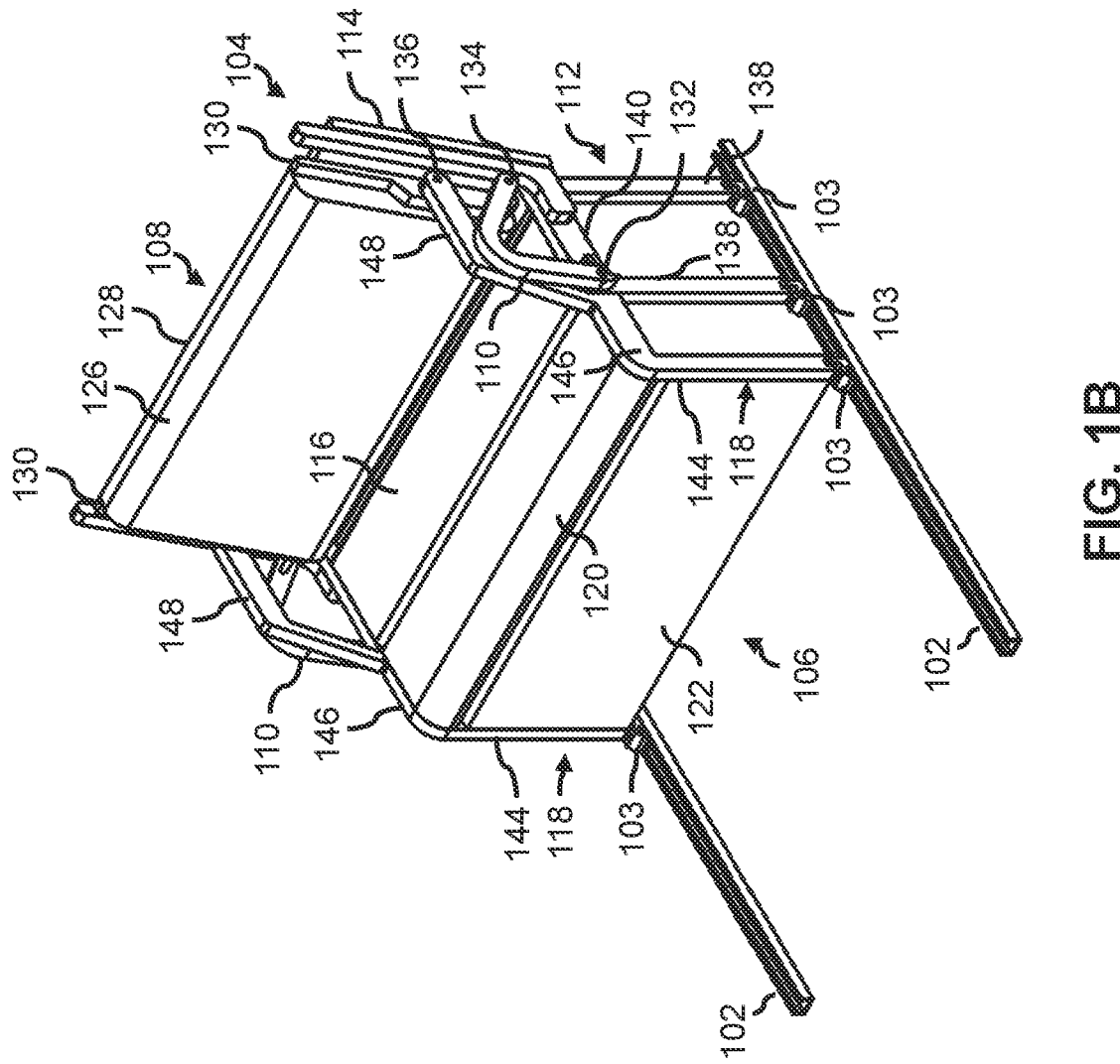
FIG. 1B depicts a front right perspective view of a divan in an upright configuration with armrests which are hidden, in accordance with one or more embodiments of the present disclosure.
Figure 1C:
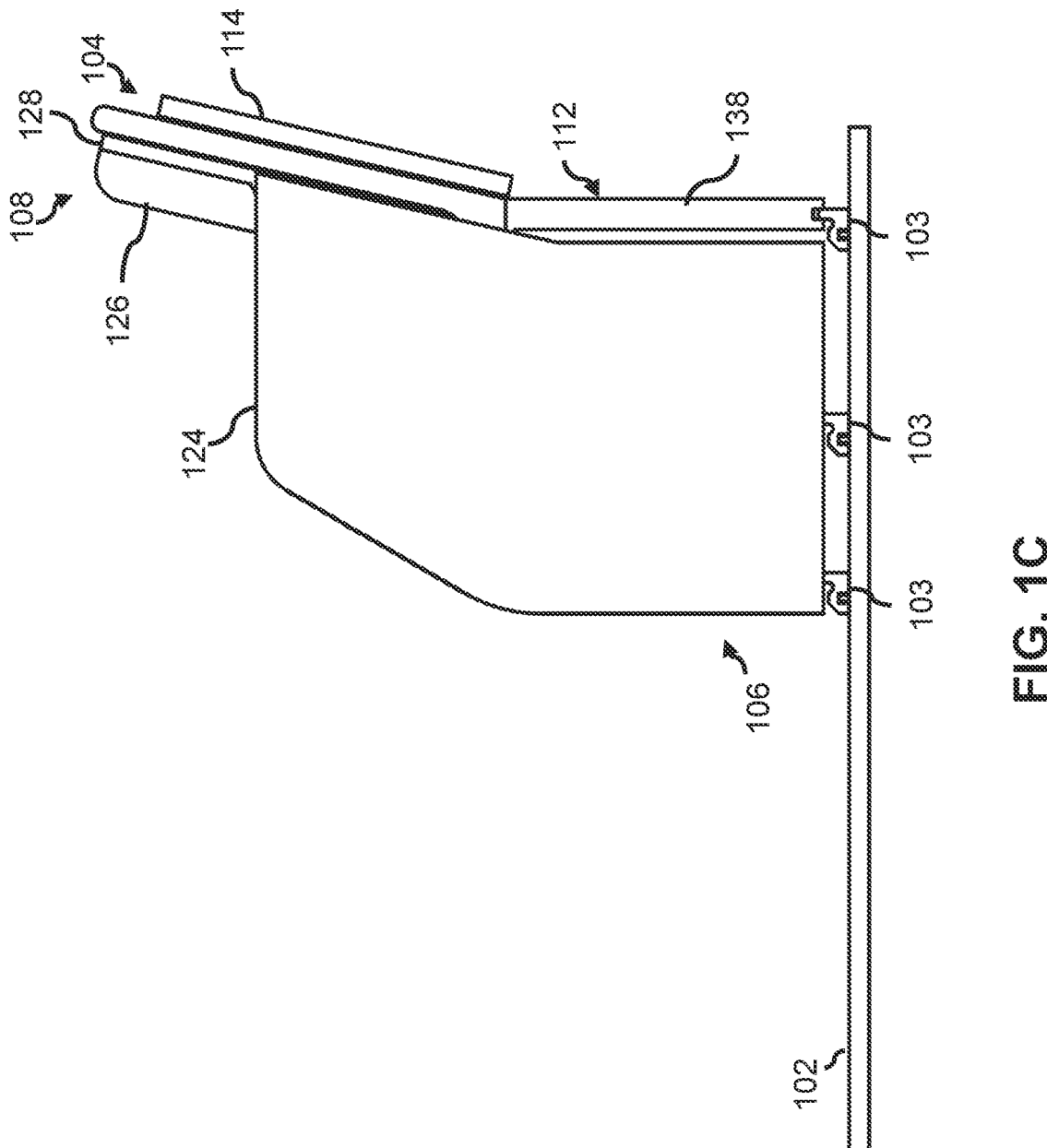
FIG. 1C depicts a right view of a divan in an upright configuration, in accordance with one or more embodiments of the present disclosure.
Figure 1D:
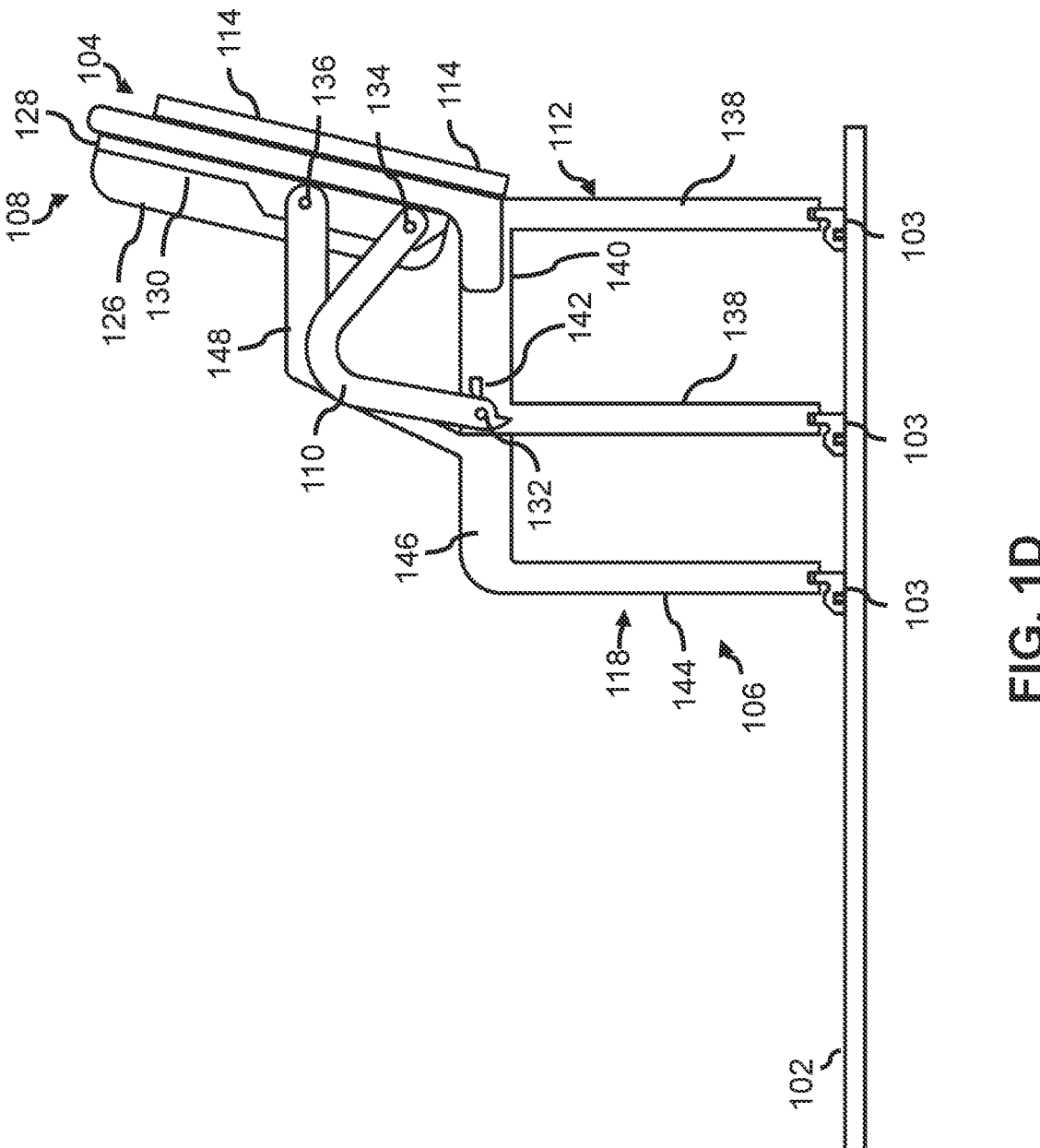
FIG. 1D depicts a right view of a divan in an upright configuration with armrests which are hidden, in accordance with one or more embodiments of the present disclosure.
Figure 2A:
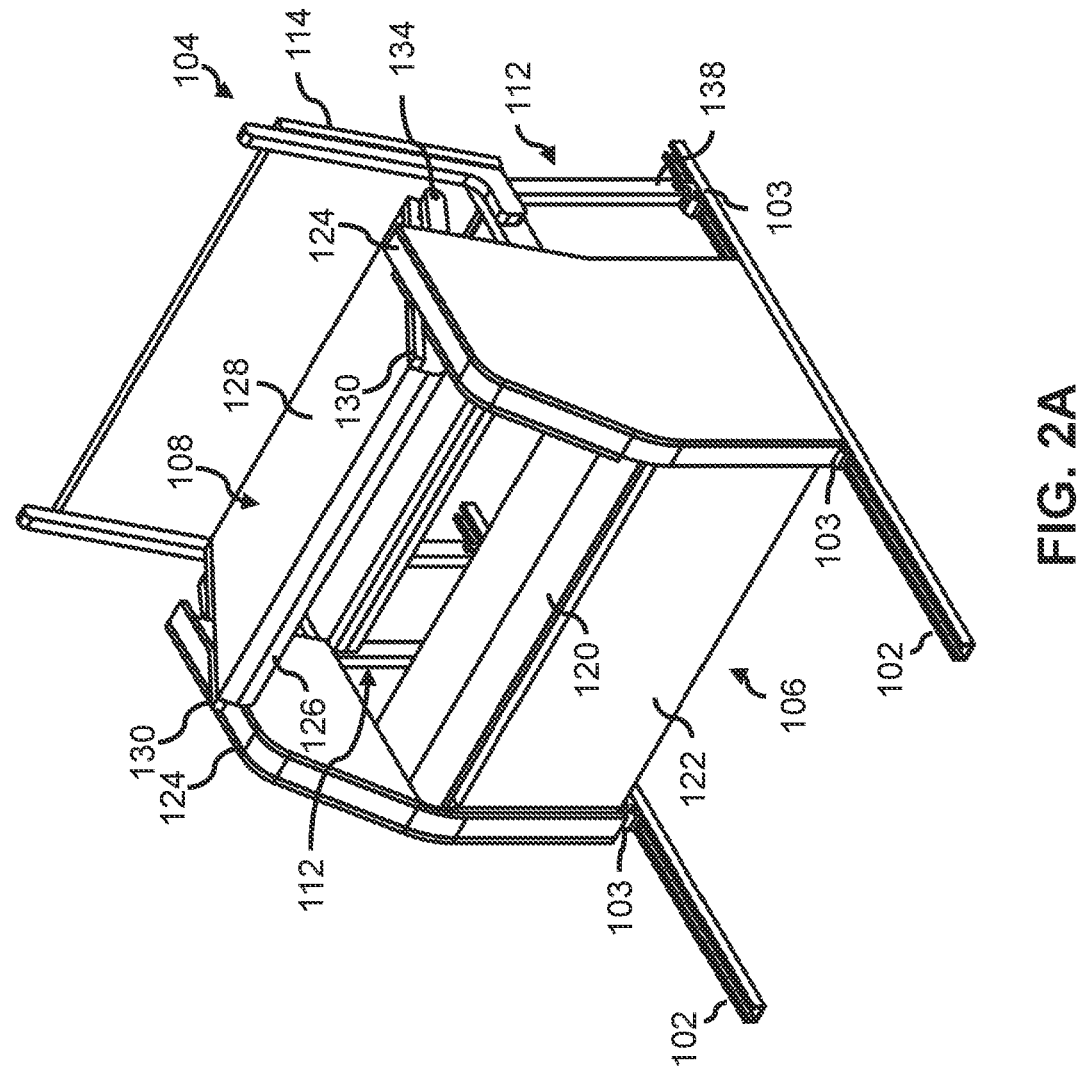
FIG. 2A depicts a front right perspective view of a divan midway between an upright configuration and a table configuration, in accordance with one or more embodiments of the present disclosure.
Figure 2B:
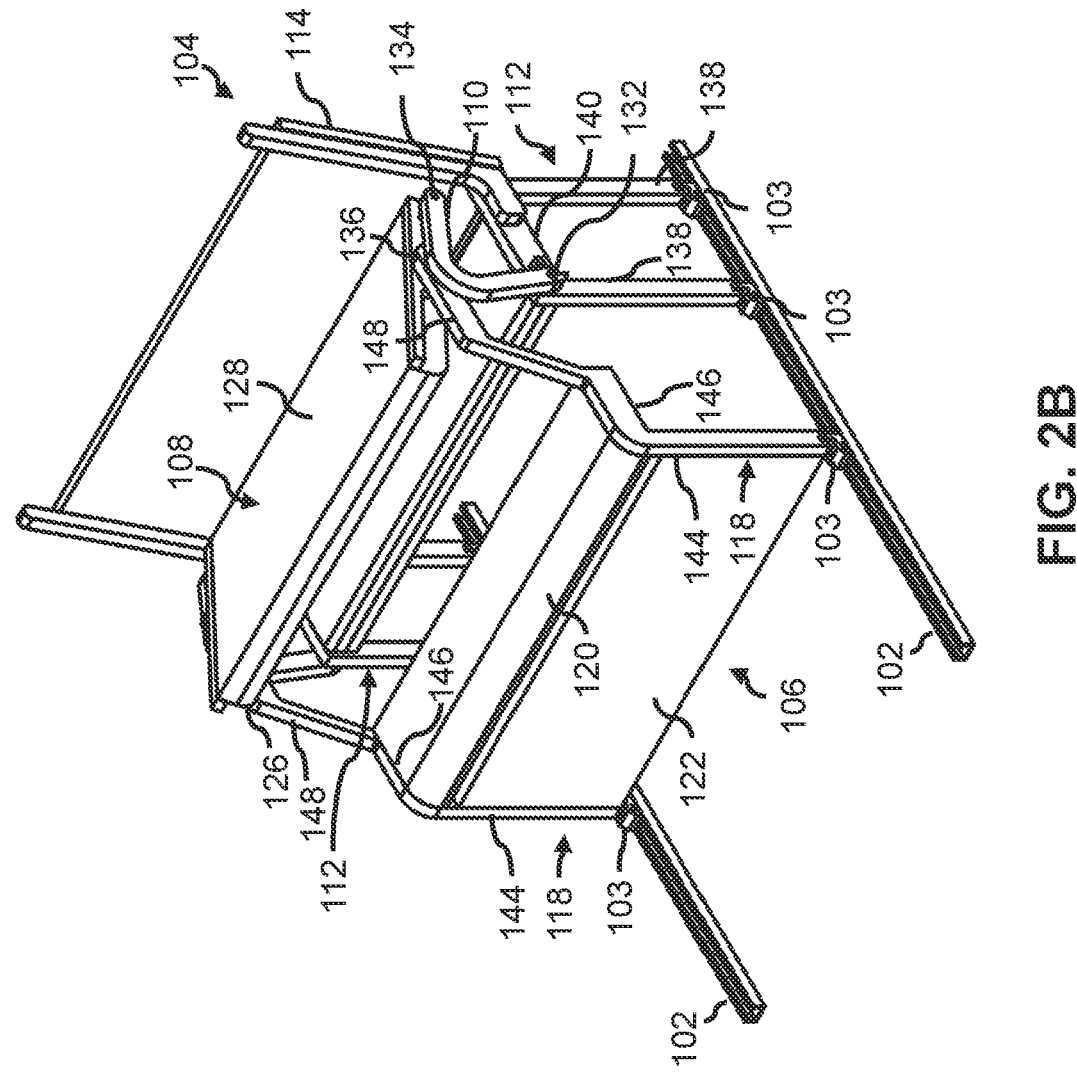
FIG. 2B depicts a front right perspective view of a divan midway between an upright configuration and a table configuration with armrests which are hidden, in accordance with one or more embodiments of the present disclosure.
Figure 2C:
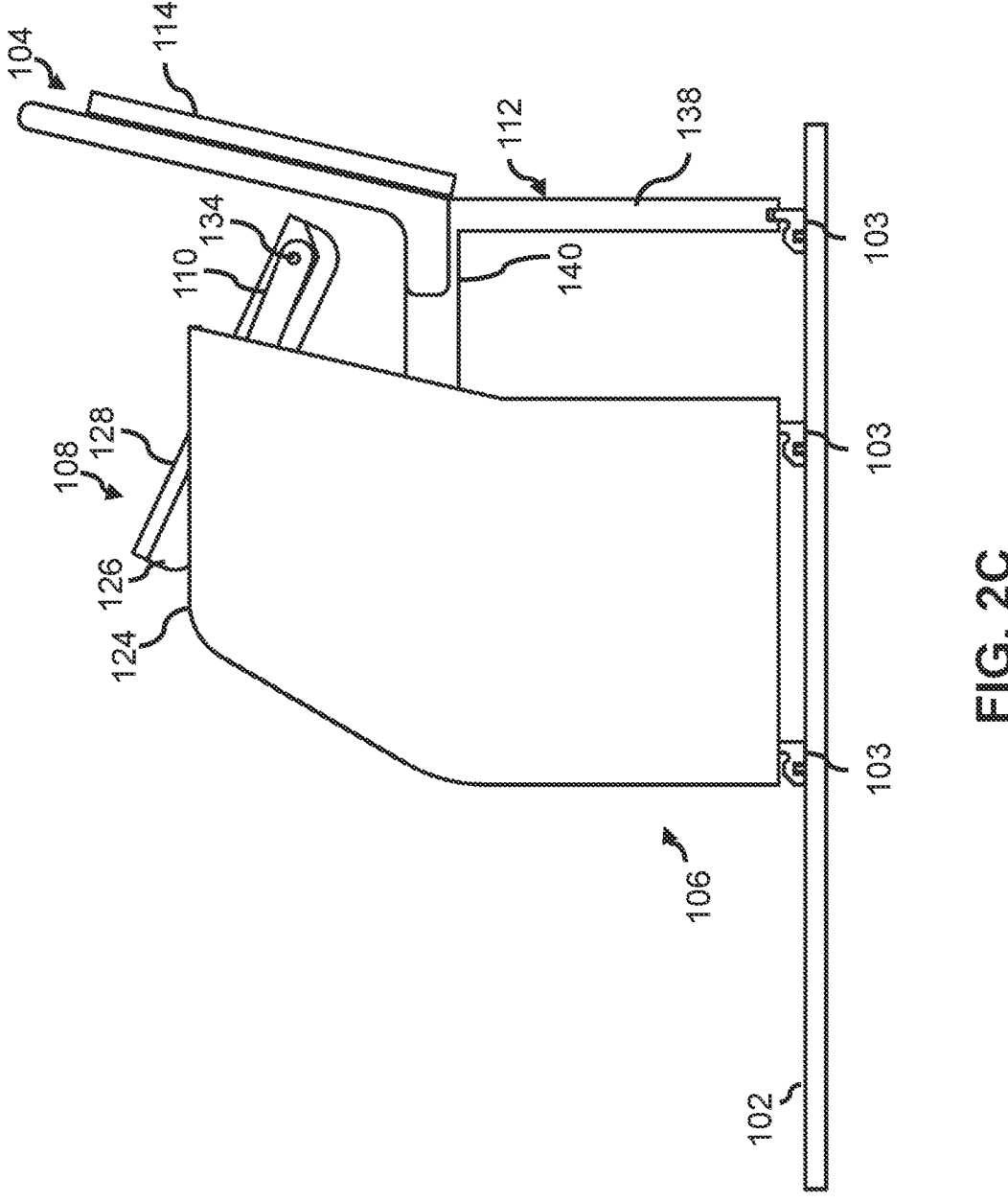
FIG. 2C depicts a right view of a divan midway between an upright configuration and a table configuration, in accordance with one or more embodiments of the present disclosure.
Figure 2D:
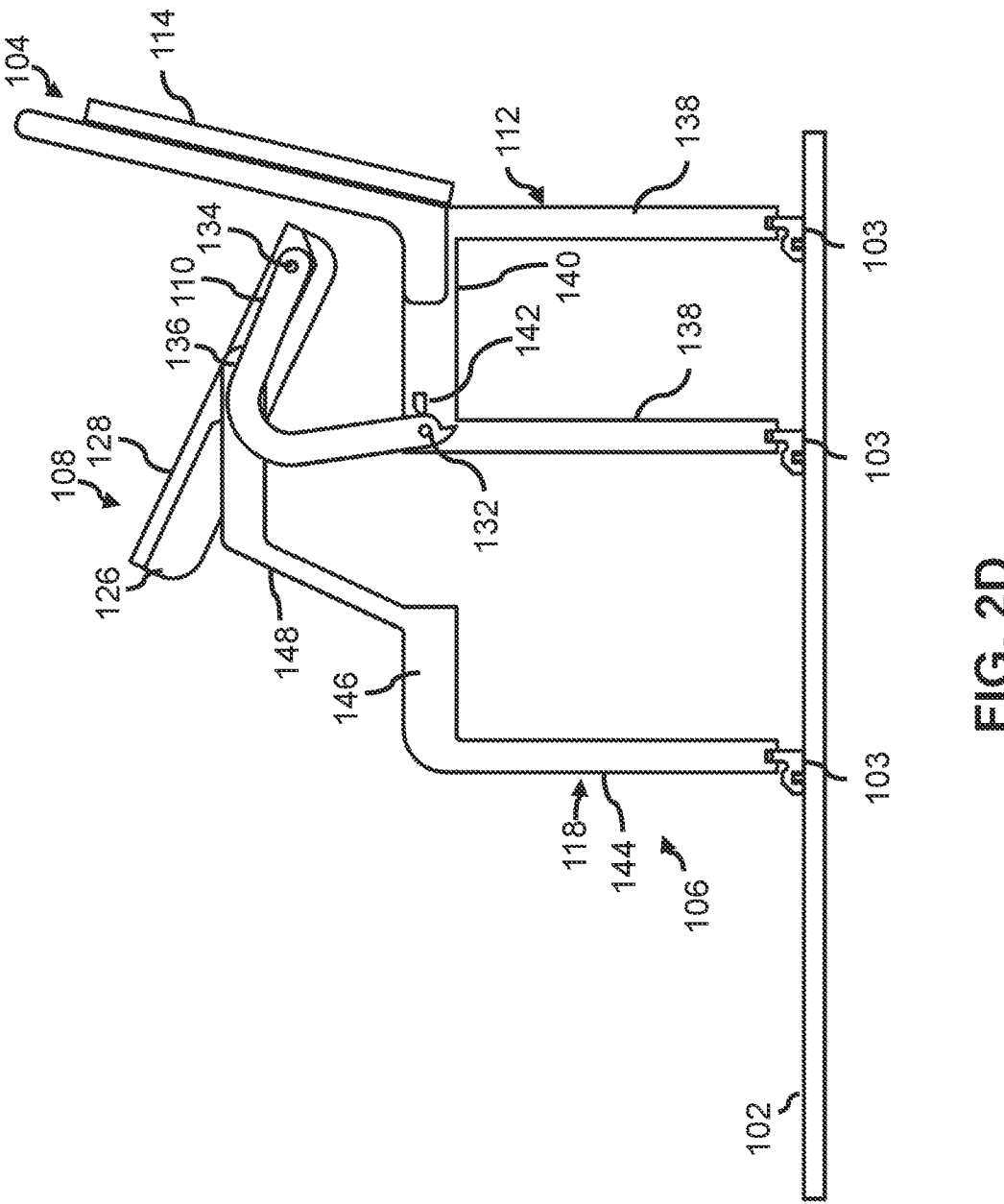
FIG. 2D depicts a right view of a divan midway between an upright configuration and a table configuration with armrests which are hidden, in accordance with one or more embodiments of the present disclosure.
Figure 3A:
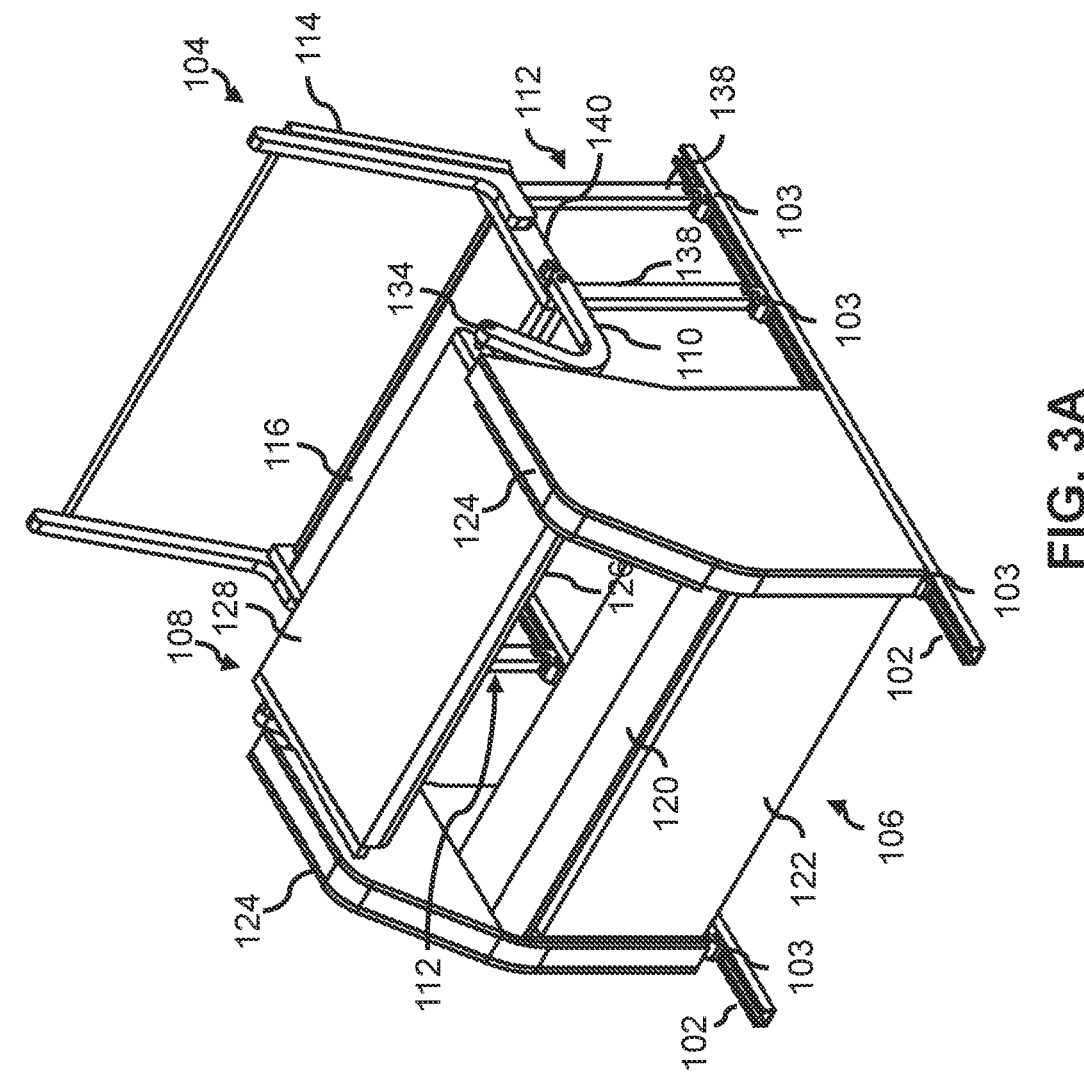
FIG. 3A depicts a front right perspective view of a divan in a table configuration, in accordance with one or more embodiments of the present disclosure.
Figure 3B:
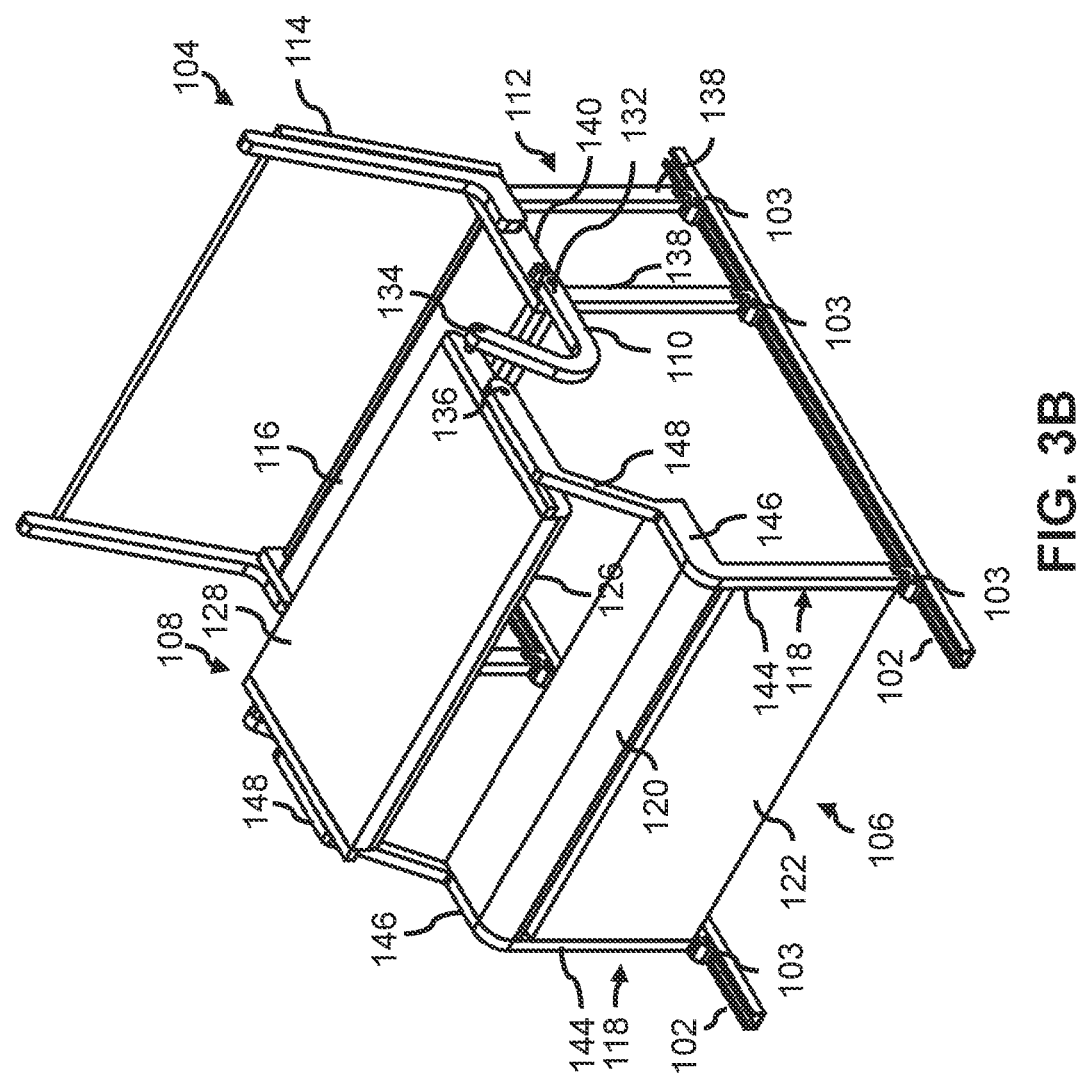
FIG. 3B depicts a front right perspective view of a divan in a table configuration with armrests which are hidden, in accordance with one or more embodiments of the present disclosure.
Figure 3C:
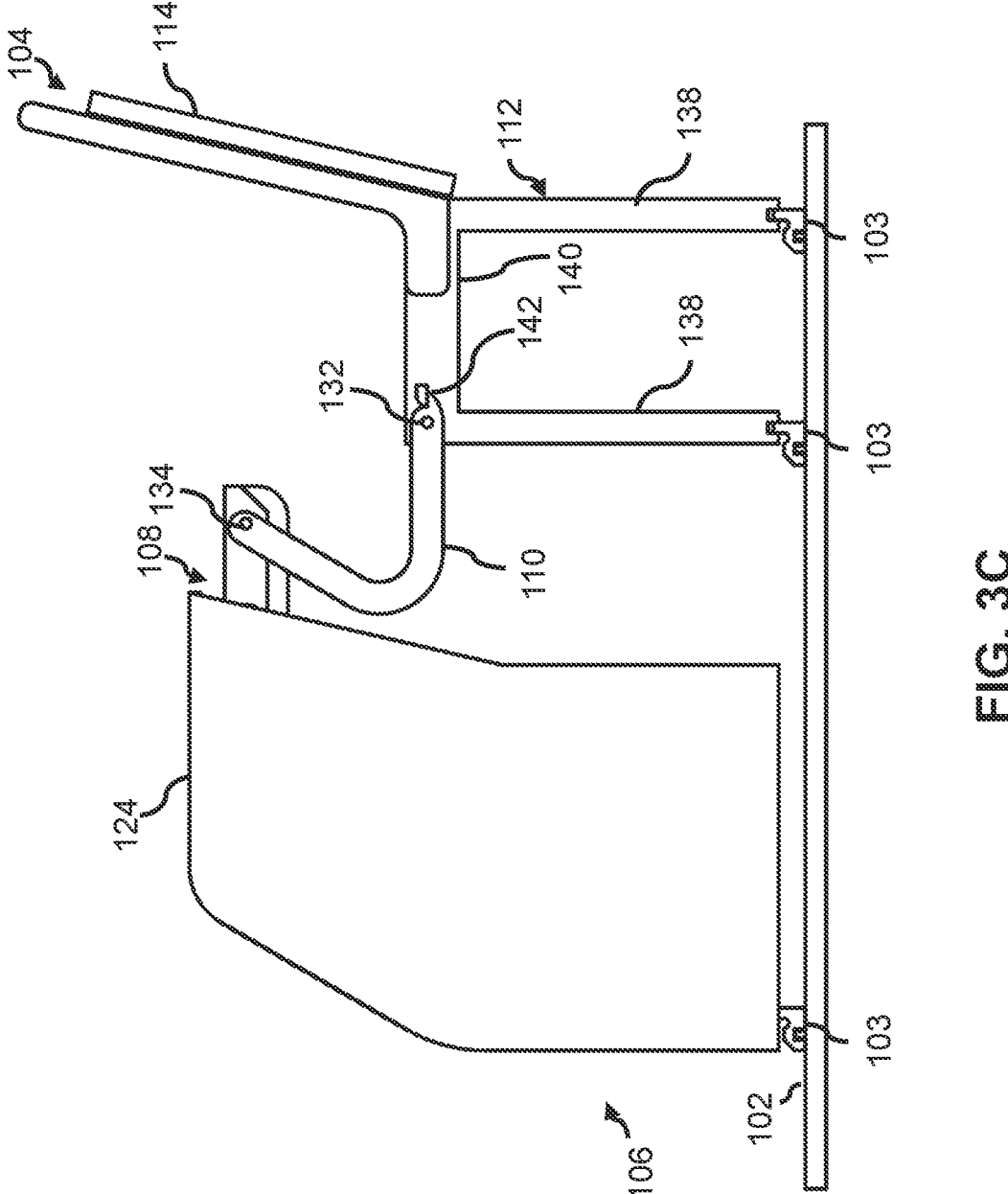
FIG. 3C depicts a right view of a divan in a table configuration, in accordance with one or more embodiments of the present disclosure.
Figure 3D:
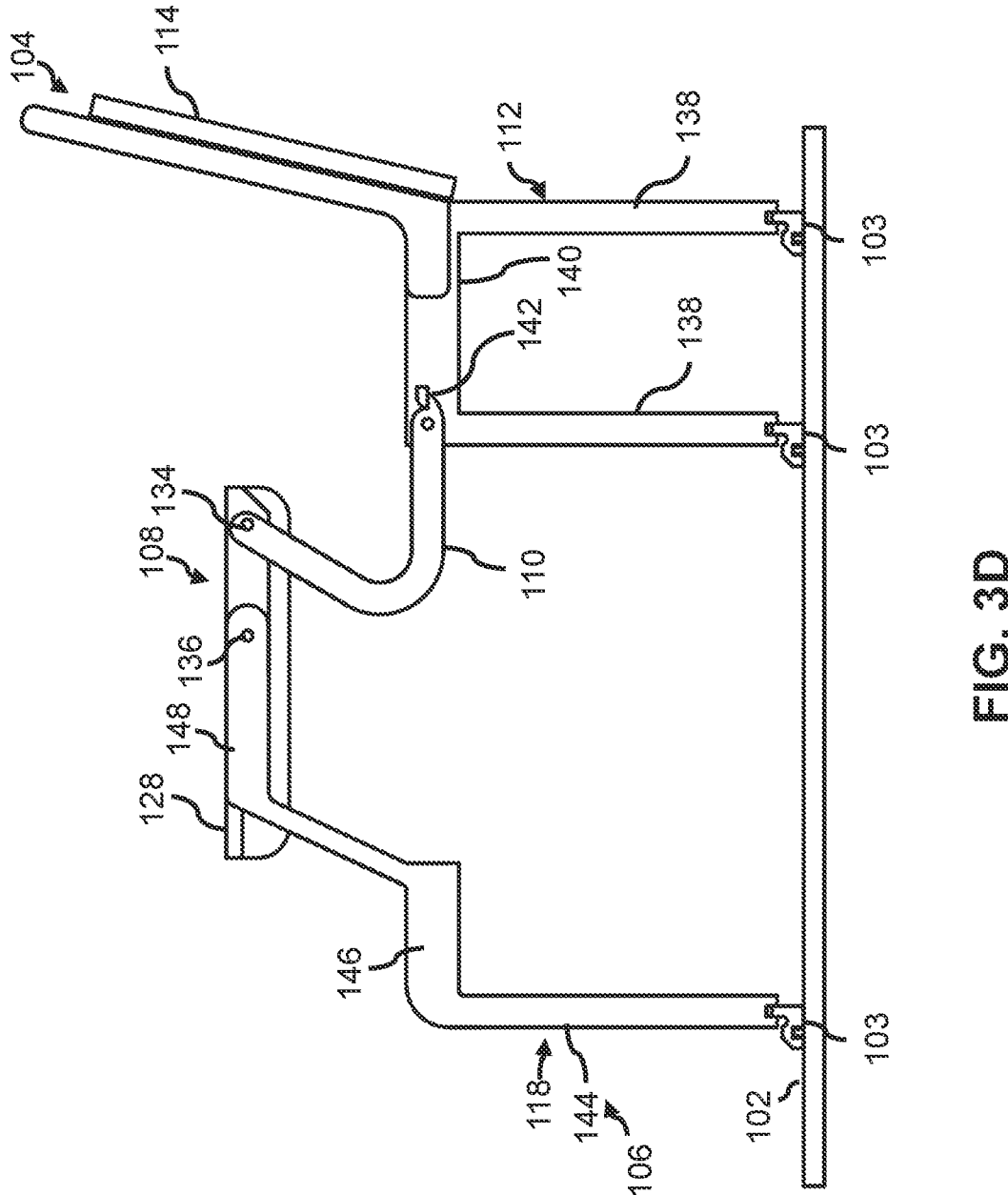
FIG. 3D depicts a right view of a divan in a table configuration with armrests which are hidden, in accordance with one or more embodiments of the present disclosure.

Referring to FIGS. 1A-3D, a divan 100 is described, according to one or more embodiments of the present disclosure. The divan 100 may also be referred to as a work and dine divan. The divan 100 may be a seat which is configured as a couch, lounge, settee, sofa, or the like. The divan 100 may include one or more components, such as, but not limited to, floor tracks 102, floor track fittings 103, fixed assembly 104, trackable assembly 106, backrest assembly 108, rotatable linkages 110, revolute joints 132, revolute joints 134, revolute joints 136, and the like.

The divan 100 may include the floor tracks 102. The floor tracks 102 may be tracks which are coupled to a floor. The floor tracks 102 may be any suitable track, such as, but not limited to, E-tracks, L-tracks, and the like. Various pieces of furniture, including the divan 100, may be attached to the floor tracks 102. The floor tracks 102 may be constructed so that furniture may be affixed thereto at any selected (or predetermined) location along the length of the floor tracks 102. In embodiments, the divan 100 may include a pair of the floor tracks 102. The pair of floor tracks 102 may be aligned in parallel.

The divan 100 may include one or more floor track fittings 103. The floor track fittings 103 may include any suitable floor track fitting, such as, but not limited to, threaded stud fittings, threaded double stud fittings, and the like. In embodiments, the floor track fittings 103 may be quick-release fittings. The floor track fittings 103 may be received by and coupled to the floor tracks 102. The fixed assembly 104 and/or the trackable assembly 106 may be coupled to the floor tracks by one or more floor track fittings 103.

The divan 100 may include the fixed assembly 104. The fixed assembly 104 may include one or more components such as, but not limited to fixed base frames 112, fixed backrest frame 114, a fixed seat pan cushion 116, and the like. The fixed base frames 112, fixed backrest frame 114, a fixed seat pan cushion 116 of the fixed assembly 104 may also be considered fixed in that each of the components are fixed with the fixed assembly 104.

The fixed assembly 104 may include the fixed base frames 112. For example, the fixed base frames 112 may include a pair of fixed base frames 112 which are disposed at opposing ends of the fixed assembly 104. For instance, the fixed base frames 112 may include a first of the fixed base frames 112 which may be disposed at a first end of the fixed assembly 104 and a second of the fixed base frames 112 which may be disposed at a second end of the fixed assembly 104.

The pair of fixed base frames 112 may be coupled to the pair of floor tracks 102. The fixed base frames 112 may support the fixed assembly 104. For example, the fixed base frames 112 may support the fixed assembly 104 by bearing a weight of the fixed assembly 104 into the floor tracks 102.

The pair of fixed base frames 112 may each include one or more portions, such as, but not limited to, a pair of fixed vertical portions 138, a fixed horizontal portion 140, a stopper portion 142, and the like.

The fixed base frames 112 may include the pair of fixed vertical portions 138. The pair of fixed vertical portions 138 may couple the fixed base frames 112 to the floor track 102. For example, the pair of fixed vertical portions 138 may couple the fixed base frames 112 to the floor track 102 via the floor track fittings 103.

The fixed base frames 112 may include a fixed horizontal portion 140. The fixed horizontal portion 140 may be disposed at upper ends of the pair of fixed vertical portions 138. The fixed horizontal portion 140 may extend between the pair of fixed vertical portions 138. The pair of fixed vertical portions 138 and the fixed horizontal portion 140 may be coplanar. For example, the pair of fixed vertical portions 138 and the fixed horizontal portion 140 may be coplanar with the floor track 102.

The fixed base frames 112 may include a stopper portion 142. The stopper portion 142 may extend from the fixed horizontal portion 140. In this regard, the stopper portion 142 may not be coplanar with the pair of fixed vertical portions 138 and the fixed horizontal portion 140.

The fixed assembly 104 may include the fixed backrest frame 114. The fixed backrest frame 114 may be coupled to the fixed base frames 112. For example, the fixed backrest frame 114 may extend between and couple the pair of the fixed base frames 112. For instance, the fixed backrest frame 114 may be coupled to the fixed horizontal portion 140 of the fixed base frames 112.

The fixed assembly 104 may include the fixed seat pan cushion 116. The fixed seat pan cushion 116 may be coupled to the fixed base frames 112. For example, the fixed seat pan cushion 116 may extend between and couple the pair of fixed base frames 112. For instance, the fixed seat pan cushion 116 may be coupled to the fixed horizontal portion 140 of the fixed base frames 112.

The divan 100 may include the trackable assembly 106. The trackable assembly 106 may be considered trackable in that the trackable assembly 106 may be tracked along the floor tracks 102. For example, the trackable assembly 106 may linearly track along the pair of floor tracks 102.

The trackable assembly 106 may include one or more components, such as, but not limited to, trackable base frames 118, trackable seat pan cushion 120, trackable front closeout 122, trackable armrests 124, and the like. The trackable base frames 118, trackable seat pan cushion 120, trackable front closeout 122, trackable armrests 124 of the trackable assembly 106 may also be considered trackable in that each of the components track with the trackable assembly 106.

The trackable assembly 106 may include trackable base frames 118. For example, the trackable base frames 118 may include a pair of trackable base frames 118 which are disposed at opposing ends of the trackable assembly 106. For instance, the trackable base frames 118 may include a first of the trackable base frames 118 which may be disposed at a first end of the trackable assembly 106 and a second of the trackable base frames 118 which may be disposed at a second end of the trackable assembly 106.

The pair of trackable base frames 118 may be coupled to the pair of floor tracks 102. The trackable base frames 118 may support the trackable assembly 106. For example, the trackable base frames 118 may support the trackable assembly 106 by bearing a weight of the trackable assembly 106 into the floor tracks 102.

The pair of trackable base frames 118 may each include one or more portions, such as, but not limited to, a trackable vertical portion 144, a trackable horizontal portion 146, a trackable linkage portion 148, and the like.

The pair of trackable base frames 118 may each include the trackable vertical portion 144. The trackable vertical portion 144 may couple the pair of trackable base frames 118 to the floor track 102. For example, the trackable vertical portion 144 may couple the trackable base frames 118 to the floor track 102 via the floor track fittings 103.

The pair of trackable base frames 118 may each include the trackable horizontal portion 146. The trackable horizontal portion 146 may be disposed at an upper end of the trackable vertical portion 144. The trackable horizontal portion 146 may extend from the trackable vertical portion 144.

The trackable base frames 118 may include trackable linkage portion 148. The trackable linkage portion 148 may extend from the trackable horizontal portion 146. In embodiments, the trackable linkage portion 148 may be disposed above the fixed base frames 112. For example, the trackable linkage portion 148 may be disposed above the fixed horizontal portion 140 of the fixed base frames 112.

The trackable vertical portion 144, the trackable horizontal portion 146, and/or the trackable linkage portion 148 may be coplanar. For example, the trackable vertical portion 144, the trackable horizontal portion 146, and/or the trackable linkage portion 148 may be coplanar with the floor track 102.

The trackable assembly 106 may include trackable seat pan cushion 120. The trackable seat pan cushion 120 may be coupled to the trackable base frames 118. For example, the trackable seat pan cushion 120 may extend between and couple the pair of trackable base frames 118. For instance, the trackable seat pan cushion 120 may be coupled to the trackable horizontal portion 146 of the trackable base frames 118.

The fixed seat pan cushion 116 and the trackable seat pan cushion 120 may each be set at a seat pan angle. The seat pan angle may be defined relative to the floor tracks 102, the floor to which the floor tracks 102 are coupled, or the like. In embodiments, the seat pan angle may be approximately 0 degrees (e.g., 0 degrees+−1 degree). For example, top surfaces of the fixed seat pan cushion 116 and/or the trackable seat pan cushion 120 may be parallel with the floor tracks 102.

The trackable assembly 106 may include trackable front closeout 122. The trackable front closeout 122 may be coupled to the trackable base frames 118. For example, the trackable front closeout 122 may extend between and couple the pair of trackable base frames 118. For instance, the trackable front closeout 122 may be coupled to the trackable vertical portion 144 of the trackable base frames 118. In embodiments, the trackable front closeout 122 may include one or more cushions (not depicted). In this regard, the trackable front closeout 122 may also be a trackable leg rest. In embodiments, the trackable front closeout 122 may enclose an area disposed below the trackable assembly 106. In this regard, the trackable front closeout 122 may be a front cover or the like.

The trackable assembly 106 may include trackable armrests 124. For example, the divan 100 may include a pair of trackable armrests 124. The trackable armrests 124 may be disposed at opposing ends of the trackable assembly 106. For instance, the trackable armrests 124 may include a first of the trackable armrests 124 which may be disposed at a first end of the trackable assembly 106 and a second of the trackable armrests 124 which may be disposed at a second end of the trackable assembly 106.

The pair of trackable armrests 124 may be coupled to the pair of trackable base frames 118. Each of the trackable armrests 124 may be coupled to a corresponding of the trackable base frames 118. For example, the first of the trackable armrests 124 may be coupled to the first of the trackable base frames 118 and the second of the trackable armrests 124 may be coupled to the second of the trackable base frames 118. The trackable front closeout 122 and/or the trackable seat pan cushion 120 may be disposed between the trackable armrests 124 and/or the trackable base frames 118.

The divan 100 may include the backrest assembly 108. The backrest assembly 108 may include one or more components, such as, but not limited to, a seat back cushion 126, a table top 128, backrest brackets 130, and the like.

The backrest assembly 108 may include the seat back cushion 126. The backrest assembly 108 may include the table top 128. The table top 128 may include a veneer, a laminate, or the like. The table top 128 may be used as a dining table, a workstation, a multi-purpose table, or the like. The table top 128 may be coupled to the seat back cushion 126. In embodiments, the seat back cushion 126 and the table top 128 may disposed on opposing faces of the backrest assembly 108.

The backrest assembly 108 may include the backrest brackets 130. For example, the backrest assembly 108 may include a pair of backrest brackets 130. The pair of backrest brackets 130 may be disposed at opposing ends of the backrest assembly 108. For instance, the backrest assembly 108 may include a first of the backrest brackets 130 which may be disposed at a first end of the backrest assembly 108 and a second of the backrest brackets 130 which may be disposed at a second end of the backrest assembly 108. The pair of backrest brackets 130 may be coupled to the seat back cushion 126 and/or the table top 128.

The divan 100 may include the rotatable linkages 110. For example, the divan 100 may include a pair of the rotatable linkages 110. The pair of the rotatable linkages 110 may be disposed at opposing ends of the fixed assembly 104. For example, the rotatable linkages 110 may include a first of the rotatable linkages 110 which is disposed at a first end of the fixed assembly 104 and a second of the rotatable linkages 110 which may be disposed at a second end of the fixed assembly 104. The pair of fixed base frames 112 and/or the fixed seat pan cushion 116 may be disposed between the pair of rotatable linkages 110.

The rotatable linkages 110 may include a selected shape. For example, the pair of rotatable linkages 110 may include a boomerang shape. For instance, the boomerang shape may include an L-shape, a V-shape, a C-shape shape, an arcuate shape, or the like. It is further contemplated that the rotatable linkages 110 may include a straight line-shape (e.g., an I-shape).

The divan 100 may include revolute joints 132. The revolute joints 132 may include a pair of revolute joints 132. The fixed assembly 104 and the pair of rotatable linkages 110 may be coupled by the pair of revolute joints 132. For example, the pair of fixed base frames 112 and the pair of rotatable linkages 110 may be coupled by revolute joints 132. For instance, the revolute joints 132 may be coupled to the fixed horizontal portion 140 of each of the pair of fixed base frames 112. The pair of revolute joints 132 may include a first of the pair of revolute joints 132 and a second of the pair of revolute joints 132. The first of the pair of revolute joints 132 may couple the first of the fixed base frames 112 and the first of the rotatable linkages 110 and a second of the pair of revolute joints 132 may couple the second of the fixed base frames 112 and the second of the rotatable linkages 110.

The revolute joints 132 may constrain the motion of the rotatable linkages 110 relative to the fixed assembly 104. In particular, the rotatable linkages 110 may be configured to rotate relative to the fixed assembly 104 about the revolute joints 132. The revolute joints 132 may prevent translation of the rotatable linkages 110 relative to the fixed assembly 104. Thus, the rotatable linkages 110 may include one degree-of-freedom relative to the fixed assembly 104 by the revolute joints 132. The revolute joints 132 may include a horizontal axis of rotation. In this regard, the rotatable linkages 110 may rotate about the revolute joints 132 in the horizontal axis of rotation.

The divan 100 may include revolute joints 134. The revolute joints 134 may include a pair of revolute joints 134. The backrest assembly 108 and the pair of rotatable linkages 110 may be coupled by pair of revolute joints 134. For example, the backrest brackets 130 and the rotatable linkages 110 may be coupled by revolute joints 134. The revolute joints 134 may rotate with the rotatable linkages 110 about the revolute joints 132. In embodiments, the revolute joints 132 and the revolute joints 134 may be coupled to opposing ends of the rotatable linkages 110. In embodiments, the revolute joints 134 may be coupled to an end of the backrest brackets 130. The pair of revolute joints 134 may include a first of the pair of revolute joints 134 and a second of the pair of revolute joints 134. A first of the pair of revolute joints 134 may couple the first of the backrest brackets 130 and the first of the rotatable linkages 110 and a second of the pair of revolute joints 134 may couple the second of the backrest brackets 130 and the second of the rotatable linkages 110.

The revolute joints 134 may constrain the motion of the backrest assembly 108 relative to the rotatable linkages 110. In particular, the backrest assembly 108 may be configured to rotate relative to the rotatable linkages 110 about the revolute joints 134. The revolute joints 134 may prevent translation of the backrest assembly 108 relative to the rotatable linkages 110. Thus, the backrest assembly 108 may include one degree-of-freedom relative to the rotatable linkages 110 by the revolute joints 134. The revolute joints 134 may include a horizontal axis of rotation. In this regard, the backrest assembly 108 may rotate about the revolute joints 134 in the horizontal axis of rotation.

The divan 100 may include revolute joints 136. The revolute joints 136 may include a pair of revolute joints 136. The trackable assembly 106 and the backrest assembly 108 may be coupled by the pair of revolute joints 136. For example, the pair of fixed base frames 112 and the pair of backrest brackets 130 may be coupled by the pair of revolute joints 136. The revolute joint 136 may track with the trackable assembly 106. In embodiments, the revolute joints 136 may be coupled to an end of the trackable linkage portion 148 of the fixed base frames 112. In embodiments, the revolute joints 136 may be coupled mid-way between the opposing ends of the brackets 130. The pair of revolute joints 136 may include a first of the pair of revolute joints 136 and a second of the pair of revolute joints 136. The first of the pair of revolute joints 136 may couple the first of the fixed base frames 112 and the first of the backrest brackets 130 and the second of the pair of revolute joints 136 may couple the second of the fixed base frames 112 and the second of the backrest brackets 130.

The revolute joints 136 may constrain the motion of the backrest assembly 108 relative to the trackable assembly 106. In particular, the backrest assembly 108 may be configured to rotate relative to the trackable assembly 106 about the revolute joints 136. The revolute joints 136 may prevent translation of the backrest assembly 108 relative to the trackable assembly 106. Thus, the backrest assembly 108 may include one degree-of-freedom relative to the trackable assembly 106 by the revolute joints 136. The revolute joints 136 may include a horizontal axis of rotation. In this regard, the backrest assembly 108 may rotates about the revolute joints 136 in the horizontal axis of rotation.

The revolute joints 132, the revolute joints 134, and the revolute joints 136 may be referred to as a first pair of revolute joints, a second pair of revolute joints, and a third pair of revolute joints, respectively. The revolute joints may be pivot joints, hinge joints, or the like. The revolute joints 132, the revolute joints 134, and the revolute joints 136 may each share a common axis of rotation. For example, the revolute joints 132, the revolute joints 134, and the revolute joints 136 may each include a horizontal axis of rotation.

In embodiments, the rotatable linkages 110 and the trackable base frames 118 may support the backrest assembly 108. The rotatable linkages 110 and the trackable base frames 118 may support the backrest assembly 108 via the revolute joints 134 and the revolute joints 136, respectively. The rotatable linkages 110 are further supported by the fixed base frames 112. Thus, a load path may be formed from the backrest assembly 108 to the floor tracks 102.

In embodiments, the fixed assembly 104, the trackable assembly 106, the backrest assembly 108, and the rotatable linkages 110 may form a pair of four-bar linkages. For example, the fixed base frames 112, the trackable base frames 118, the backrest brackets 130, and the rotatable linkages 110 may form the pair of four-bar linkages through rotation about the revolute joints 132, the revolute joints 134, and the revolute joints 136 in combination with tracking the trackable assembly 106. The tracking of the trackable assembly 106 along the pair of floor tracks 102 may be a prismatic joint of the four-bar linkages. The backrest assembly 108 may be driven by the trackable base frames 118 tracking along the floor tracks 102. The rotatable linkages 110 may follow the backrest assembly 108.

In embodiments, the divan 100 may be configured in an upright configuration.

The fixed seat pan cushion 116 and the trackable seat pan cushion 120 may provide a joint seat pan when the divan 100 is in the upright configuration. In embodiments, the fixed seat pan cushion 116 and the trackable seat pan cushion 120 may abut when the divan 100 is in the upright configuration. In embodiments, the fixed seat pan cushion 116 and the trackable seat pan cushion 120 may be flush when the divan 100 is in the upright configuration. Flush may refer to substantially level or an unbroken surface. The fixed seat pan cushion 116 and the trackable seat pan cushion 120 may be flush by the seat pan angle of the fixed seat pan cushion 116 and the trackable seat pan cushion 120 being equal and the fixed seat pan cushion 116 and the trackable seat pan cushion 120 being at a same height. Thus, top surfaces of the fixed seat pan cushion 116 and the trackable seat pan cushion 120 may be flush. The fixed seat pan cushion 116 and the trackable seat pan cushion 120 being flush when the divan 100 is in the upright configuration may be desirable to ensure passenger comfort. The fixed seat pan cushion 116 and the trackable seat pan cushion 120 may abut and be flush to provide the joint seat pan when the divan 100 is in the upright configuration.

The backrest assembly 108 may provide a backrest when the divan 100 is in the upright configuration. The backrest assembly 108 may be disposed at a seatback angle when the divan 100 is configured in the upright configuration. The seatback angle may be defined relative to the floor tracks 102, the floor to which the floor tracks 102 are coupled, or the like. In embodiments, the seatback angle may be between 90 to 110 degrees. For example, seatback angle may be between 97 to 103 degrees. Thus, the seatback angle may be at a positive angle. The positive angle may be desirable to allow a passenger to recline against the backrest assembly 108 when the divan 100 is in the upright configuration.

In embodiments, the fixed assembly 104 and the trackable assembly 106 jointly provide a seating region for one or more passengers when the divan 100 is in the upright configuration. The fixed seat pan cushion 116 and the trackable seat pan cushion 120 may be jointly provide the seat pan and the seat back cushion 126 may provide the backrest for one or more passengers sitting on the fixed assembly 104 and the trackable assembly 106. The one or more passengers sitting on both the fixed assembly 104 and the trackable assembly 106 when the divan 100 is in the upright configuration may rest their arms on the trackable armrests 124. The one or more passengers may sit in a side-by-side arrangement. The divan 100 may be sized so that one passenger, two passengers, or more may sit together in a side-by-side configuration. It is contemplated that the divan 100 may accommodate up to three passengers when the divan 100 is in the upright configuration.

The revolute joint 134 may be proximate to the fixed seat pan cushion 116 when the divan 100 is in the upright configuration. The trackable linkage portion 148 of each of the pair of trackable base frames 118 may be disposed above the pair of fixed base frames 112 when the divan 100 is configured in the upright configuration.

In embodiments, the backrest assembly 108 may cover the fixed backrest frame 114 when the divan 100 is in the upright configuration. For example, the backrest assembly 108 may cover the fixed backrest frame 114 by abutting the fixed backrest frame 114. For instance, the table top 128 may abut the fixed backrest frame 114 when the divan 100 is in the upright configuration.

In embodiments, the divan 100 may be configured in a table configuration.

In embodiments, the fixed seat pan cushion 116 and the trackable seat pan cushion 120 may be separated when the divan 100 is in the table configuration. For example, the fixed seat pan cushion 116 and the trackable seat pan cushion 120 may be separated by the backrest assembly 108 when the divan 100 is in the table configuration. The fixed seat pan cushion 116 and the trackable seat pan cushion 120 may thus be considered to form a splitable cushion.

The backrest assembly 108 may be disposed at a table angle when the divan 100 is configured in the table configuration. The table angle may be defined relative to the floor tracks 102, the floor to which the floor tracks 102 are coupled, or the like. In embodiments, the table angle may be may be approximately 0 degrees (e.g., 0 degrees+−1 degree). For example, the table top 128 of the backrest assembly 108 may be parallel with the floor tracks 102. The seat back cushion 126 may be oriented downwards towards the floor tracks 102 when the divan 100 is in the table configuration. For example, the seat back cushion 126 may be inverted to the fixed seat pan cushion 116 and/or the trackable seat pan cushion 120 when the divan 100 is configured in the table configuration.

The fixed backrest frame 114 may not be covered when the divan 100 is in the table configuration. For example, the backrest assembly 108 may not cover the fixed backrest frame 114 when the divan 100 is in the table configuration.

In embodiments, the fixed assembly 104 and the trackable assembly 106 separately provide seating regions for one or more passengers when the divan 100 is in the table configuration. One or more passengers may sit at the seating region provided by the fixed assembly 104 and one or more passengers may sit at the seating region provided by the trackable assembly 106, each facing each other and sharing the table top 128 of the backrest assembly 108.

The fixed assembly 104 may provide a first seating region for one or more passengers when the divan 100 is in the table configuration. For example, the fixed backrest frame 114 and the fixed seat pan cushion 116 may provide a backrest and a seat pan, respectively, for a passenger sitting on the fixed assembly 104 in the table configuration. The one or more passengers may sit in a side-by-side arrangement. The fixed backrest frame 114 and the fixed seat pan cushion 116 may be sized so that one passenger, two passengers, or more may sit together in a side-by-side configuration. It is contemplated that the fixed backrest frame 114 and the fixed seat pan cushion 116 may accommodate up to three passengers when the divan 100 is in the table configuration.

Similarly, the trackable assembly 106 may provide a second seating region for one or more passengers when the divan 100 is in the table configuration. For example, the trackable seat pan cushion 120 may provide a seat pan for one or more passengers sitting on the trackable assembly 106 in the table configuration. The one or more passengers sitting on the trackable assembly 106 when the divan 100 is in the table configuration may rest their arms on the trackable armrests 124. The trackable assembly 106 may not provide a backrest for the passenger sitting on the trackable assembly 106 in the table configuration. The one or more passengers may sit in a side-by-side arrangement. The trackable assembly 106 may be sized so that one passenger, two passengers, or more may sit together in a side-by-side configuration. It is contemplated that the trackable assembly 106 may accommodate up to three passengers when the divan 100 is in the table configuration.

Thus, it is contemplated that the divan 100 may accommodate up to six passengers when the divan 100 is in the table configuration. For example, the fixed seat pan cushion 116 may accommodate up to three passengers and the trackable assembly 106 may accommodate up to three passengers.

It is contemplated that the boomerang shape of the rotatable linkages 110 may improve egress/ingress for the one or more passengers sitting on the fixed assembly 104 while the divan 100 is in the table configuration.

In embodiments, the divan 100 may be configurable between the upright configuration and the table configuration. The fixed assembly 104 may be maintained at a fixed position relative to the floor tracks 102 when the divan 100 is configured between the upright configuration and the table configuration. Similarly, the revolute joints 132 may remain at a fixed position relative to the fixed assembly 104 as the divan 100 is configured between the upright configuration and the table configuration. The trackable assembly 106 may track along the floor track 102, causing the divan 100 to be configured between the upright configuration and the table configuration. In embodiments, the backrest assembly 108 may rotate between the seatback angle and the table angle as the divan 100 is configured between the upright configuration and the table configuration. Thus, the backrest assembly 108 may pivot away from the fixed backrest frame 114 as the divan 100 is configured from the upright configuration to the table configuration. The rotation of the backrest assembly 108 may also cause the rotatable linkages 110 to rotate about the revolute joints 132. The divan 100 may accurately controlled between upright configuration and the table configuration by the pair of four-bar linkages.

In embodiments, the pair of trackable armrests 124 may enclose the trackable linkage portion 148 of each of the pair of trackable base frames 118, the pair of rotatable linkages 110, the pair of revolute joints 132, the pair of revolute joints 134, and/or the pair of revolute joints 136. In this regard, the trackable armrests 124 may be shrouds. The trackable armrests 124 may enclose the various components to avoid pinch points as the divan 100 is configured between the upright configuration and the table configuration. For example, the trackable armrests 124 may enclose the trackable linkage portion 148 of the trackable base frames 118, the rotatable linkages 110, revolute joint 132, revolute joint 134, and revolute joint 136 in the upright configuration. By way of another example, the trackable armrests 124 may enclose the trackable linkage portion 148 of the trackable base frames 118, a portion of the rotatable linkages 110, and the revolute joint 136 in the table configuration.

The divan 100 may include one or more mechanisms to prevent tracking the trackable assembly 106 beyond the upright configuration and/or the table configuration.

In embodiments, the pair of trackable base frames 118 may abut the pair of fixed base frames 112 when the divan 100 is in the upright configuration. For example, the trackable horizontal portion 146 of the trackable base frames 118 may abut the fixed horizontal portion 140 of the fixed base frames 112 when the divan 100 is in the upright configuration. The abutment between the trackable base frames 118 and the fixed base frames 112 may prevent the trackable assembly 106 from tracking beyond the upright position. The trackable base frames 118 do not abut the fixed base frames 112 as the divan 100 is configured between the table configuration and the upright configuration. Thus, the trackable base frames 118 and the fixed base frames 112 may not stop the tracking until the abutment is made at the upright configuration.

In embodiments, the rotatable linkages 110 may abut the stopper portion 142 of each of the pair of fixed base frames 112 when the divan 100 is in the table configuration. The abutment between the rotatable linkages 110 and the stopper portion 142 may prevent further tracking of the trackable assembly 106 beyond the table configuration. Thus, the stopper portion 142 may stop the over rotation of the rotatable linkages 110 and henceforth may stop the further tracking. The rotatable linkages 110 may not abut the stopper portion 142 as the divan 100 is configured between the upright configuration and the table configuration. Thus, the stopper portion 142 may not stop the rotation of the rotatable linkages 110 until the abutment is made.

Referring generally again to the figures.

The floor tracks 102 may be coupled to a floor of a vehicle. It is contemplated that the divan 100 and the floor tracks 102 may be employed in various types of vehicles including, but not limited to, aircrafts, boats, vans, trains, trucks, recreational vehicles, and the like. In embodiments, the floor tracks 102 may be coupled to a floor of an aircraft. It is contemplated that the upright configuration may be used while the aircraft is in taxi, take-off, landing (TTOL) and/or cruise. It is contemplated that the table configuration may be used while the aircraft is in cruise. It is contemplated that the divan 100 may be installed on the aircraft in one or more directions. For example, the divan 100 may be installed on the aircraft in forward facing (e.g., toward the heading of the aircraft), aft facing, side facing (e.g., to a side of the heading of the aircraft), or the like. It is contemplated that the divan 100 may be installed on any size aircraft. In embodiments, the divan 100 may be installed on a narrow-body business jet aircraft. The divan 100 may be particularly advantageous for narrow-body business jet aircraft, to provide both the upright configuration and the table configuration, without requiring separate divans and tables.

The divan 100 may meet or exceed one or more regulatory requirements. In embodiments, the divan 100 may meet dynamic and static testing requirements of the FAA per 14 CFR Parts 25.561 and 25.562 for aircraft seating. In embodiments, the divan 100 is a side-facing divan which is certified to meet FAA requirements for side-facing divans per FAA Policy PS-ANM-25-03-R1 as it pertains to occupant protection.

The divan 100 may be configured between the upright configuration and the table configuration manually or automatically. In embodiments, the divan 100 may be manually manipulated between the upright configuration and the table configuration. For example, the divan 100 may be manually manipulated by pushing or pulling the trackable assembly 106 along the floor tracks 102. In embodiments, the divan 100 may be automatically manipulated between the upright configuration and the table configuration. For example, the divan 100 may be automatically manipulated by electrical, pneumatic, electro-mechanical, and other actuators incorporated into the divan 100. Manually manipulating the trackable assembly 106 may offer an advantage in that the divan 100 is light in weight, because the divan 100 does not incorporate electrical motors and/or pneumatic equipment to automatically manipulate the divan 100.

In embodiments, the trackable front closeout 122 may include a handle (not depicted). The handle may be used to pull and push the trackable assembly 106.

In embodiments, the fixed backrest frame 114 may include a cushion (not depicted). The cushion may provide for a backrest when the divan 100 is in the table configuration. It is further contemplated that the fixed backrest frame 114 may not include the cushion for the backrest when the divan 100 is in the table configuration.

The fixed seat pan cushion 116, the trackable seat pan cushion 120, the fixed backrest frame 114, the seat back cushion 126, the trackable armrests 124, and the like may include upholstery. The upholstery may include dress covers which contribute to the aesthetics of the divan 100. For example, the upholstery may include a color and/or pattern which contributes to the aesthetics. The color and pattern may be adjusted to achieve the desired aesthetic. The upholstery may be fabric, leather, or any other material selected to compliment the décor within the aircraft interior.

In embodiments, the divan 100 may define a storage area. The storage area may be defined between the fixed base frames 112 and/or below the fixed seat pan cushion 116. The storage area may be accessible via the trackable front closeout 122 when the divan 100 is in the upright configuration. The storage area may be accessible via a space defined between the fixed assembly 104 and the backrest assembly 108 when the divan 100 is in the table configuration. The storage area may include, but is not limited to, life-vests.

Although the fixed assembly 104 is described as including the fixed backrest frame 114, this is not intended as a limitation of the present disclosure. It is contemplated that the fixed assembly 104 may not include the fixed backrest frame 114. The one or more passengers sitting on the fixed assembly 104 when the divan 100 is configured in the table configuration may not include the backrest formed by the fixed backrest frame 114.

Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A divan comprising:
a fixed assembly, the fixed assembly comprising:
a pair of fixed base frames;
a fixed backrest frame; wherein the fixed backrest frame extends between and couples the pair of fixed base frames; and
a fixed seat pan cushion; wherein the fixed seat pan cushion extends between and couples the pair of fixed base frames;
a trackable assembly, the trackable assembly comprising:
a pair of trackable base frames;
a trackable seat pan cushion; wherein the trackable seat pan cushion extends between and couples the pair of trackable base frames; and
a pair of trackable armrests; wherein the pair of trackable armrests are coupled to the pair of trackable base frames;
a backrest assembly, the backrest assembly comprising:
a seat back cushion; and
a table top; wherein the seat back cushion and the table top are disposed on opposing faces of the backrest assembly; and
a pair of rotatable linkages; wherein the fixed assembly, the trackable assembly, the backrest assembly, and the pair of rotatable linkages form a pair of four-bar linkages; wherein the divan is configurable between an upright configuration and a table configuration; wherein the backrest assembly covers the fixed backrest frame when the divan is in the upright configuration; wherein the backrest assembly does not cover the fixed backrest frame when the divan is in the table configuration.

2. The divan of claim 1, comprising a pair of floor tracks; wherein the pair of floor tracks are aligned in parallel; wherein the pair of fixed base frames and the pair of trackable base frames are coupled to the pair of floor tracks; wherein the trackable assembly tracks along the pair of floor tracks causing the divan to be configured between the upright configuration and the table configuration; wherein the fixed assembly is fixed to the pair of floor tracks as the trackable assembly tracks along the pair of floor tracks.

3. The divan of claim 1, wherein the fixed assembly, the trackable assembly, and the backrest assembly jointly provide a seating region when the divan is in the upright configuration; wherein the fixed assembly and the trackable assembly separately provide seating regions when the divan is in the table configuration.

4. The divan of claim 1, wherein the pair of fixed base frames each comprise a pair of fixed vertical portions and a fixed horizontal portion; wherein the fixed horizontal portion extends between the pair of fixed vertical portions.

5. The divan of claim 4, wherein the pair of fixed base frames each comprise a stopper portion; wherein the stopper portion extends from the fixed horizontal portion; wherein the pair of rotatable linkages abut the stopper portion of each of the pair of fixed base frames when the divan is in the table configuration.

6. The divan of claim 1, wherein the pair of trackable base frames abut the pair of fixed base frames when the divan is in the upright configuration.

7. The divan of claim 1, wherein the pair of trackable base frames each comprise:

a trackable vertical portion;
a trackable horizontal portion; wherein the trackable horizontal portion extends from the trackable vertical portion; and
a trackable linkage portion; wherein the trackable linkage portion extends from the trackable horizontal portion; wherein the trackable linkage portion of each of the pair of trackable base frames are disposed above the pair of fixed base frames when the divan is in the upright configuration.

8. The divan of claim 7, wherein the pair of trackable armrests enclose the trackable linkage portion of each of the pair of trackable base frames and the pair of rotatable linkages.

9. The divan of claim 1, wherein the fixed seat pan cushion and the trackable seat pan cushion provide a joint seat pan when the divan is in the upright configuration; wherein the fixed seat pan cushion and the trackable seat pan cushion are separated by the backrest assembly when the divan is in the table configuration.

10. The divan of claim 9, wherein the fixed seat pan cushion and the trackable seat pan cushion abut and are flush to provide the joint seat pan when the divan is in the upright configuration.

11. The divan of claim 1, comprising:
a first pair of revolute joints; wherein the pair of fixed base frames and the pair of rotatable linkages are coupled by the first pair of revolute joints;
a second pair of revolute joints; wherein the backrest assembly and the pair of rotatable linkages are coupled by the second pair of revolute joints; and
a third pair of revolute joints; wherein the trackable assembly and the backrest assembly are coupled by the third pair of revolute joints;
wherein the fixed assembly, the trackable assembly, the backrest assembly, and the pair of rotatable linkages form the pair of four-bar linkages through rotation about the first pair of revolute joints, the second pair of revolute joints, and the third pair of revolute joints in combination with tracking of the trackable assembly.

12. The divan of claim 1, wherein the pair of fixed base frames are disposed between the pair of rotatable linkages.

13. The divan of claim 1, wherein the pair of rotatable linkages comprise a boomerang shape.

14. The divan of claim 1, wherein the backrest assembly is disposed at a seatback angle when the divan is in the upright configuration; wherein the backrest assembly is disposed at a table angle when the divan is in the table configuration.

15. A divan comprising:
a fixed assembly, the fixed assembly comprising:
a pair of fixed base frames; wherein the pair of fixed base frames each comprise a pair of fixed vertical portions, a fixed horizontal portion, and a stopper portion; wherein the fixed horizontal portion extends between the pair of fixed vertical portions; wherein the stopper portion extends from the fixed horizontal portion; and
a fixed seat pan cushion; wherein the fixed seat pan cushion extends between and couples the pair of fixed base frames;
a trackable assembly, the trackable assembly comprising:
a pair of trackable base frames;
a trackable seat pan cushion; wherein the trackable seat pan cushion extends between and couples the pair of trackable base frames; and a pair of trackable armrests; wherein the pair of trackable armrests are coupled to the pair of trackable base frames;

a backrest assembly, the backrest assembly comprising:

a seat back cushion; and a table top; wherein the seat back cushion and the table top are disposed on opposing faces of the backrest assembly; and a pair of rotatable linkages; wherein the fixed assembly, the trackable assembly, the backrest assembly, and the pair of rotatable linkages form a pair of four-bar linkages; wherein the divan is configurable between an upright configuration and a table configuration; wherein the pair of rotatable linkages abut the stopper portion of each of the pair of fixed base frames when the divan is in the table configuration.

\* \* \* \* \*